No. 880,307. PATENTED FEB. 25, 1908.
R. E. JEFFERY.
WAGON WHEEL.
APPLICATION FILED SEPT. 23, 1907.

Witnesses
C. H. Griesbauer

Inventor
R. E. Jeffery.
by H. B. Willson & Co
Attorneys

UNITED STATES PATENT OFFICE.

RICHARD EDGAR JEFFERY, OF PIEDMONT, CALIFORNIA.

WAGON-WHEEL.

No. 880,307.　　　　Specification of Letters Patent.　　　Patented Feb. 25, 1908.

Application filed September 23, 1907. Serial No. 394,158.

*To all whom it may concern:*

Be it known that I, RICHARD EDGAR JEFFERY, a citizen of the United States, residing at Piedmont, in the county of Alameda and State of California, have invented certain new and useful Improvements in Wagon-Wheels; and I do declare the following to be a full, clear, and exact description of the invention, such as will enable others skilled in the art to which it appertains to make and use the same.

This invention relates to vehicle wheels, being especially directed to the manner of connecting the felly sections to permit of expansion in applying the tire.

The invention has for its objects to provide a comparatively simple, inexpensive device of this character wherein the meeting ends of the rim sections will be properly supported, and one wherein the tire will securely engage and be held fixedly upon the rim and will preclude the entrance of sand between the tire and rim.

With these and other objects in view, the invention comprises the novel features of construction and combination of parts more fully hereinafter described.

Figure 1:
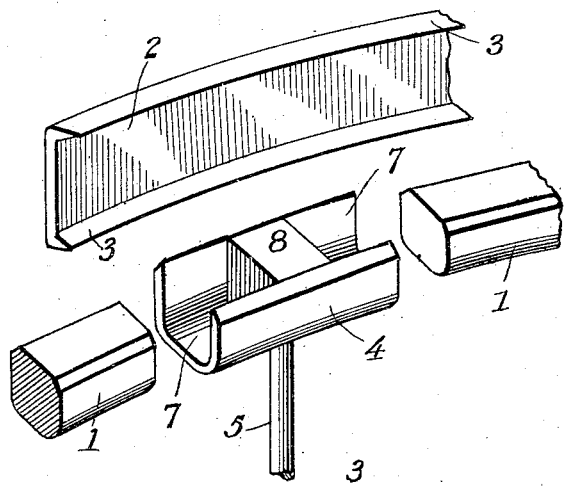
Figure 2:
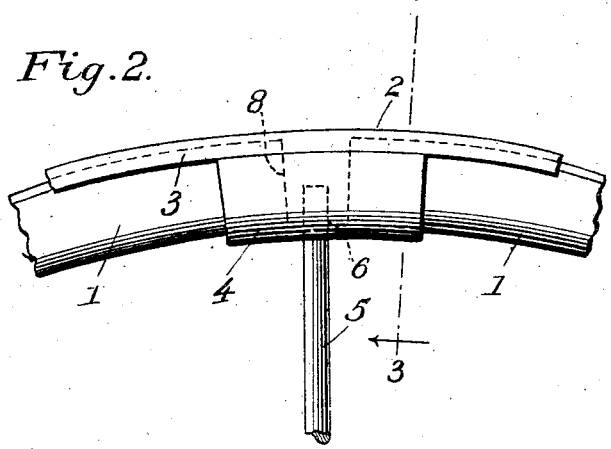
Figure 3:
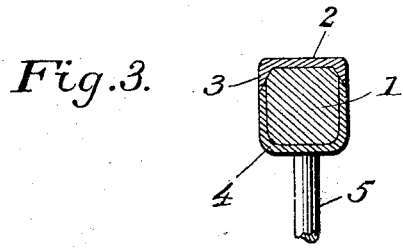

In the accompanying drawings, Figure 1 is a perspective view of a portion of a vehicle wheel embodying the invention, and showing the parts separated; Fig. 2 is a side elevation with the parts of the wheel assembled; and Fig. 3 is a detail cross sectional view taken on the line 3—3 of Fig. 2.

Referring to the drawings, it will be seen that the wheel rim comprises a plurality of sections, 1, adapted to be assembled in the manner hereinafter explained, and to receive the tire, 2. The tire is by preference composed of steel and is of the form shown, having a substantially flat inner face to bear on the margin of the rim 1, and longitudinal side flanges, 3, which engage the edges of the rim for holding the tire in place thereon. The flanges, 3, have their inner faces downwardly and outwardly beveled or inclined, whereby when the tire is applied to the rim, the flanges will act with a wedging action, and, consequently, bind tightly thereon to prevent the entrance of sand or other foreign matter between the tire and rim. This is an important feature, for the reason that in instances where sand enters between the tire and the rim, it rapidly wears the rim away, thereby causing the tire to become loose and rattle.

In accordance with the invention, the rim sections are joined by means of a clip, 4, applied to the end of one of the spokes, 5, and having a socket, 6, to receive the spoke end, there being formed at the ends of the clip, 4, a pair of sockets, 7, of a form in cross section corresponding to and adapted to receive the ends of the rim sections, 1, the sockets 7 being separated by means of a center block, or partition, 8, formed in the clip.

In practice, after the rim sections have been connected by means of the clip, 4, the tire is applied as shown in Fig. 2, and the rim sections expanded as usual in devices of this character for tightening the tire upon the wheel, it being apparent that in expanding the sections 1, the ends thereof may move in the sockets, 7, and will, at the same time, be firmly supported by the clip. It will also be observed that the clip is of slightly less depth than the felly sections, whereby when the tire is applied, the side flanges, 3, will bear upon the outer edges of the clip, 4.

Having thus fully described my invention, what I claim as new and desire to secure by Letters-Patent, is:

In a vehicle wheel, the combination of a spoke, a clip applied to the outer end thereof and having opposed end sockets, a pair of rim sections having their ends seated in said sockets and of a height greater than the depth of the sockets, and a tire applied to said rim and having flanges to rest on the edges of said clip and to bear on the side faces of said rim.

In testimony whereof I have hereunto set my hand in presence of two subscribing witnesses.

RICHARD EDGAR JEFFERY.

Witnesses:
　　JOHN W. GWILT,
　　FRED W. FRY.